United States Patent [19]
Yoshihiro et al.

[11] Patent Number: 4,978,498
[45] Date of Patent: Dec. 18, 1990

[54] METHOD FOR REMOVING BINDER FROM GREEN BODY

[75] Inventors: Yoshiro Yoshihiro, Yachiyo; Masahiro Adachi, Atsugi; Minoru Imai, Sagamihara, all of Japan

[73] Assignee: Nippon Welding Rod Company, Ltd., Tokyo, Japan

[21] Appl. No.: 480,211

[22] Filed: Feb. 14, 1990

[30] Foreign Application Priority Data

Dec. 11, 1989 [JP] Japan .................................. 1-320922

[51] Int. Cl.$^5$ .............................................. B22F 7/00
[52] U.S. Cl. ....................................... 419/37; 264/63; 419/36
[58] Field of Search ........................ 419/36, 37; 264/63

[56] References Cited

U.S. PATENT DOCUMENTS

| | | | |
|---|---|---|---|
| 4,305,756 | 12/1981 | Wiech, Jr. | 75/211 |
| 4,582,677 | 4/1986 | Sugino et al. | 419/2 |
| 4,772,437 | 9/1988 | Reavely et al. | 264/22 |
| 4,855,102 | 8/1989 | Okada et al. | 419/8 |

OTHER PUBLICATIONS

Japanese Patent Publication No. 48563/1986.
Japanese Patent Publication No. 33282/1987.

Primary Examiner—Stephen J. Lechert, Jr.
Assistant Examiner—Leon Nigohosian, Jr.
Attorney, Agent, or Firm—Pearne, Gordon, McCoy & Granger

[57] ABSTRACT

A method of removing a binder from a green body capable of accomplishing the binder removal at a substantially reduced temperature and in a significantly reduced period of time. The binder mainly consists of a polymer material of ultraviolet degradation properties such as, for example, a polymer material having a main chain containing a tertiary carbon atom. The green body is irradiated with ultraviolet rays at a temperature within the range of 150° C. to 300° C. under an atmospheric pressure to rapidly carry out the photo degradation of the polymer material by ultraviolet rays, so that the binder may be readily removed from the green body.

11 Claims, 1 Drawing Sheet

METHOD FOR REMOVING BINDER FROM GREEN BODY

BACKGROUND OF THE INVENTION

This invention relates to a method for removing a binder from a green body which is a shaped article formed of a powder material, and more particularly to a method for removing, from a green body which is generally prepared by forming a pellet of a powder material such as ceramic powders or particles, cermet powders or particles, metal powders or particles or the like using a binder and subjecting the so-prepared pellet to injection molding, the binder contained in the green body.

Recently, attention has been paid to the injection molding of a powder material such as ceramic powders or particles or the like from the viewpoint of a new method for preparing a shaped article.

Conventionally, the removing of a binder from a green body by thermal decomposition or degradation is practiced according to a method for removing a binder under pressure generally called a pressure degreasing method in the art and typically disclosed in Japanese Pat. Publication No. 33282/1987 and U.S. Pat. No. 4,305,756 or an unsaturation degreasing method disclosed in, for example, Japanese Pat. Publication No. 48563/1986.

In the pressure degreasing method, a pressure in a pressure chamber in which a green body is placed is raised to a level above the vapor pressure of a binder incorporated in the green body at an ambient temperature, so that the binder may be vaporized, resulting in volatilizing from the green body. This leads to the removal of the binder from the green body.

The unsaturation degreasing method is so constructed that a green body having a binder contained therein is placed on a binder absorbent and then heated to a temperature within the range between the melting point of a minimum-melting-point component of the binder and the melting point of a maximum-melting-point component of the binder, resulting in removing the minimum-melting-point component of the binder from the green body. Subsequently, the green body is heated to a temperature within the range between the melting point of the maximum-melting-point component and the sintering temperature of a powder material constituting the green body to remove the maximum-melting point component of the binder, resulting in the full removal of the binder from the green body.

Unfortunately, the above-described conventional binder removal methods by thermal degradation each requires to heat the green body to an elevated temperature. Also, the heating must be carried out for a long period of time. For example, the removal of the binder from the green body requires to heat the green body or binder for a period of time as long as from about three days to one week. Thus, each of the conventional methods requires much time and expense, resulting in the cost of a final shaped product being highly increased.

SUMMARY OF THE INVENTION

The present invention has been made in view of the foregoing disadvantage of the prior art while taking notice of the fact that when a certain polymer material or a polymer material of ultraviolet decomposition or degradation properties is used as a binder for a green body and irradiated with ultraviolet rays for the purpose of the removal of the binder, the polymer is subject to photo decomposition or degradation, resulting in the amount of time required for the binder removal being reduced to a degree about one fifth to one twentieth as long as the prior art, as well as the binder removal being accomplished at a substantially reduced temperature as compared with the prior art.

Accordingly, it is an object of the present invention to provide a method for removing a binder from a green body which is capable of accomplishing the removal of the binder at a significantly reduced cost.

It is another object of the present invention to provide a method for removing a binder from a green body which is capable of accomplishing the binder removal at a substantially decreased temperature and in a substantially reduced period of time.

It is a further object of the present invention to provide a method for removing a binder from a green body which is capable of permitting an apparatus for the binder removal to be highly simplified.

It is still another object of the present invention to provide a method for removing a binder from a green body which is capable of accomplishing the binder removal without adversely affecting a final shaped product.

It is yet another object of the present invention to provide a method for removing a binder from a green body which is capable of ensuring the economical efficiency of the binder removal.

It is a still further object of the present invention to provide a method for removing a binder from a green body which is capable of substantially preventing most of powder materials for the green body from being oxidized, to thereby ensure the quality of a final shaped product.

In accordance with the present invention, a method for removing a binder from a green body is provided. The binder mainly consists of a polymer material of ultraviolet degradation properties. The method comprises the step of irradiating the green body with ultraviolet rays at a temperature sufficient to cause the polymer to carry out photo degradation by ultraviolet rays, resulting in the binder being removed from the green body.

In a preferred embodiment of the present invention, the polymer material has a main chain containing a tertiary carbon atom. The main chain of the polymer may have a carbon atom to which groups selected from the group consisting of an alkyl group, a phenyl group, a carbonyl group and a group having a $\pi$ electron or a non-covalent electron pair are bonded. The polymer may have a molecular weight of about 200,000 or less.

In a preferred embodiment of the present invention, the irradiation of ultraviolet rays to the green body is carried out while heating the green body. The heating of the green body may be carried out at a temperature of about 300° C. or less. Alternatively, under an atmospheric pressure, the heating of the green body may be carried out at a temperature within the range of from 150° C. to 300° C.

In a preferred embodiment of the present invention, the irradiation of ultraviolet rays to the green body is carried out using a mercury vapor lamp.

In a preferred embodiment of the present invention, the polymer is selected from the group consisting of polyisobutylene, polymethacrylic acid, polymethacrylate, polymethacrylamide, poly-α-methylstyrene and mixtures thereof.

The words "powder material(s)" and "powder(s)" used herein in connection with a material used for forming a shaped article or green body include powders, particles and the like generally used for the preparation of a shaped article by injection molding or the like.

BRIEF DESCRIPTION OF THE DRAWINGS

These and other objects and many of the attendant advantages of the present invention will be readily appreciated as the same becomes better understood by reference to the following detailed description when considered in connection with the accompanying drawings in which like reference numerals designate like or corresponding parts throughout; wherein.

DETAILED DESCRIPTION OF THE INVENTION

Figure 1:
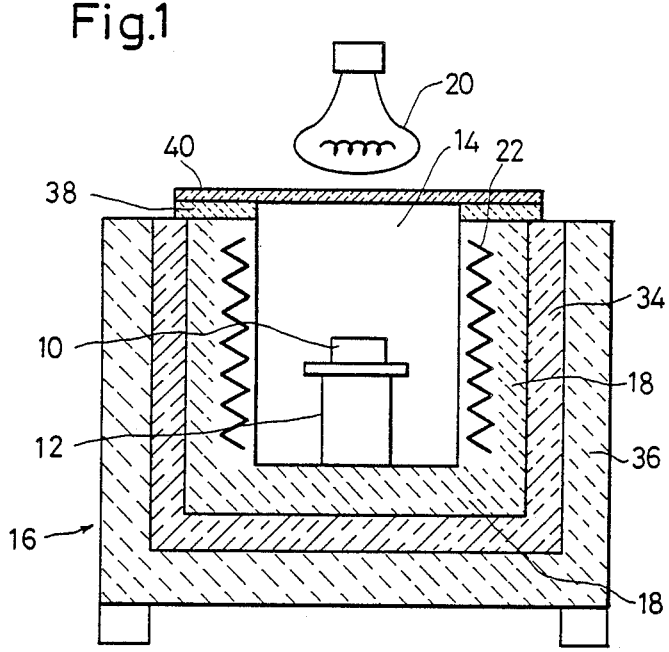
FIG. 1 is a schematic sectional view showing an oven for the photo decomposition or degradation of a binder which is suitable for use for practicing the present invention.

In general, a binder for the injection molding of a shaped article using a powder material is selected in view of its injection molding properties, its thermal stability during the molding, its capability for holding the shape of a shaped article, its removability from a shaped article and the like. Such characteristics of the binder generally depend upon the structure of a polymer material forming the binder. In the injection molding, a polymer material which is solid at a normal temperature but exhibits plasticity at an elevated temperature is generally used for a binder. Thus, the plasticity of the polymer at a high temperature is utilized for the injection molding of a shaped article and the solid properties of the polymer at a normal temperature is utilized for the shape retention of the shaped article.

In order to meet such requirements for the binder, the polymer material is required to carry out molecular motion at an elevated temperature to a degree sufficient to exhibit satisfactory plasticity and decrease the molecular motion at a normal temperature to a degree sufficient to generate intermolecular forces required for the shape retention of a shaped article.

The reason why a linear polymer material has been conventionally used as a binder for the injection molding is that it possesses such properties. Linear polymer materials which have been used for this purpose include polymers having a primary or secondary carbon atom such as, for example, polyethylene, polypropylene, polystyrene, polyvinyl acetate, polyacrylic acid and the like.

It is considered that the removal of such a polymer possessing a backbone or main chain having a primary or secondary carbon atom bonded thereto is due to the cutting or breakage of its molecular chain based on the thermal motion of its segments. Therefore, in order to promote the thermal motion of the segments it is required to heat the polymer at an elevated temperature for a long period of time. This would be the reason that the conventional binder removal by thermal degradation requires to heat the binder at a high temperature for a substantially increased period of time.

It is known that a polymer material possessing a main chain having a tertiary carbon atom bonded thereto is readily subject to photo degradation when it is exposed to or irradiated with ultraviolet rays. Such polymer may be selected from the groups consisting of, for example, polyisobutylene, polymethacrylic acid, polymethacrylate, polymethacrylamide, poly-α-methylstyrene and mixtures thereof.

For example, polymethacrylate is subject to Norrish-type degradation when it is irradiated with ultraviolet rays, leading to the degradation of the molecules. It is considered that the degradation of this type is initiated due to the excitation of $\pi$ electrons and/or non-covalent electron pairs of a carbonyl group contained therein by ultraviolet rays. Energy required for the excitation is considered to be substantially equal to the bond energy between carbon atoms, so that the cleavage of the bond may be readily accomplished without applying heat energy of a high temperature to the polymer. Also, the cleavage would be due to a radical reaction.

Miller et al called the former polymer material a cross linking type polymer and the latter one a photo degradation type polymer. Table 1 exemplifies such polymers.

TABLE 1

| Cross Linking Type Polymer (Primary or Secondary Carbon Atom) | Photo Degradation Type Polymer (Tertiary Carbon Atom) |
|---|---|
| Polyethylene $(-CH_2-CH_2-)_n$ | Polyisobutylene $(-CH_2-\underset{\underset{CH_3}{\mid}}{\overset{\overset{CH_3}{\mid}}{C}}H-)_n$ |
| Polyvinyl Chloride $(-CH_2-\underset{Cl}{\overset{\mid}{C}}H-)_n$ | Polymethacrylic Acid $(-CH_2-\underset{\underset{COOH}{\mid}}{\overset{\overset{CH_3}{\mid}}{C}}-)_n$ |
| Polyvinyl Acetate $(-CH_2-\underset{OCOCH_3}{\overset{\mid}{C}}H-)_n$ | Polymethacrylate $(-CH_2-\underset{\underset{COOR}{\mid}}{\overset{\overset{CH_3}{\mid}}{C}}-)_n$ |
| Polyvinyl Alcohol $(-CH_2-\underset{OH}{\overset{\mid}{C}}H-)_n$ | Polymethacrylamide $(-CH_2-\underset{\underset{CONH_2}{\mid}}{\overset{\overset{CH_3}{\mid}}{C}}-)_n$ |

TABLE 1-continued

| Cross Linking Type Polymer (Primary or Secondary Carbon Atom) | Photo Degradation Type Polymer (Tertiary Carbon Atom) |
|---|---|
| Polyacrylonitrile $(-CH_2-CH.CH-CH_2-)_n$ with $CN$ $CN$ | Poly-α-methylstyrene $(-CH_2-\underset{C_6H_5}{\overset{CH_3}{C}}-)_n$ |
| Polyacrylic Acid $(-CH_2-CH-)_n$ with $COOH$ | |
| Polyacrylate $(-CH_2-CH-)_n$ with $COOR$ | |
| Polyacrylamide $(-CH_2-CH-)_n$ with $CONH_2$ | |
| Polypropylene $(-CH_2-CH-)_n$ with $CH_3$ | |
| Polystyrene $(-CH_2-CH-)_n$ with $C_6H_5$ | |

Also, the heat of the polymerization may be regarded as a criterion for the degradation of a polymer material. A polymer material having small heat of polymerization is apt to be decomposed or degraded into monomers during the heat degradation, resulting in being readily degraded by ultrasonic rays. For example, the polymerization heat of polyethylene which possesses a main chain having a primary carbon atom bonded thereto is 22 kcal/mol, whereas polymethyl methacrylate which possesses a main chain having a tertiary carbon atom bonded thereto is 13 kcal/mol.

The inventors have found that as a result of fully considering the above-described characteristics of polymers and the above-described requirements for a binder for injection molding, the use of a photo degradation type polymer or a polymer of ultraviolet degradation properties as a main component of a binder for a green body followed by the irradiation of ultraviolet rays to the binder or polymer permits the amount of time required for removing the binder from the green body to be significantly reduced and the binder removal to be carried out at a substantially reduced temperature as compared with the prior art while effectively exhibiting characteristics required for the binder.

The photo degradation type polymers listed on Table 1 described above may be effectively used for the ultraviolet degradation type polymer in the present invention. In particular, it has been found that the photo degradation type polymer possessing a main chain having a tertiary carbon atom bonded thereto is preferably used for this purpose. The polymer having such a tertiary carbon atom may be selected from the group consisting of polymers of which the main chain possesses a carbon atom having a group such as an alkyl group, a phenyl group, a carbonyl group and a group having a π electron or a non-covalent electron pair. The polymer may be solid at a normal temperature and have a molecular weight of about 200,000 or less. The polymer used preferably exhibits satisfactory compatibility with a wax material conventionally used for the preparation of a green body.

Then, ultraviolet rays are irradiated to the shaped article or green body to cause the binder or polymer of the photo or ultraviolet degradation type to be subject photo degradation, resulting in removing the polymer from the green body. The irradiation of ultraviolet rays to the binder is carried out at a temperature sufficient to cause the polymer constituting or forming the binder to be subject to photo or ultraviolet degradation. For example, it may be carried out at a temperature of 300° C. or less. More specifically, it has been found that under an atmospheric pressure, the photo degradation of the binder or polymer is conveniently carried out by heating the shaped article or binder to a temperature within the range of from 150° C. to 300° C. The heating of the binder to a temperature within such a range under an atmospheric pressure does not substantially cause the thermal decomposition or degradation of the polymer constituting the binder, accordingly, it is reasonable to consider that the heating promotes the photo degradation of the polymer.

Also, it has been found that the heating at a temperature within the above-described range generally prevents most of powder materials used for forming the green body from being oxidized during the binder removing operation. However, when the green body is formed of a powder material which is easy to be oxidized at a temperature with the above-described range, the removal of the binder may be carried out in a non-oxidizing atmosphere.

In addition, it has been found that it is desirable to fluidize or liquefy the polymer for the binder in order to more effectively accomplish the removal of the binder. The ultraviolet degradation type polymer which is a main or principal component of the binder in the present invention conveniently is fluidized or takes the form of fluid or liquid at a temperature within the above-described range or between 150° C. and 300° C. Thus, the irradiation of ultraviolet rays to the binder for the removal of the binder is preferably carried out while heating the binder to a temperature between 150° C. and 300° C.

However, theoretically the binder removal according to the present invention is not limited to a temperature within the above-described range. So far as the irradiation of ultraviolet rays to the binder is carried out, the heating of the binder to a temperature above 300° C., for example, a temperature for the conventional binder removal by thermal decomposition or degradation likewise causes the removal of the binder to be carried out in the amount of time substantially equal to the binder removal at a temperature within the above-described range. This is not theoretically elucidated, however, it is considered that at such a temperature, the photo or ultraviolet degradation of the binder is carried out at a very large speed as compared with the thermal degradation of the polymer which would just occur at the temperature, resulting in the binder being substantially removed by photo degradation. It would be of course considered that the thermal degradation of the binder or polymer occurs at a temperature above 300° C. although it is disregarded as compared with the photo degradation.

Further, the binder may be removed from the green body at a temperature below 100° C. when the pressure is reduced below an atmospheric pressure. This likewise permits time required for the binder removal to be significantly decreased as compared with the conventional binder removal by thermal degradation described above.

The binder removing method according to the present invention may be practiced using a photo degradation furnace or oven unit constructed as shown in FIG. 1.

First, a powder material for a green body is formed into a pellet using a binder mainly consisting of such an ultraviolet degradation type polymer as described above. Then, the so-prepared pellet is subject to injection molding to prepare a shaped article or green body 10, which is subsequently placed on a support 12 arranged in a chamber 14 of a photo degradation oven unit 16 defined by a wall 18 made of a heat resistant material. The chamber 14 is preferably thermally isolated from the exterior of the oven unit 16 so that the green body 10 may be kept at a predetermined temperature in the chamber 14 during the binder removing process. Such insulating means will be described hereinafter.

Then, the green body 10 is irradiated with ultraviolet rays by means of an ultraviolet source 20, resulting in the binder incorporated in the green body 10 being subject to photo gradation. As the ultraviolet source 20 suitable for this purpose is used an ultraviolet lamp. For this purpose, a high-intensity short-wavelength ultraviolet lamp (200–280 nm, 1250 $\mu W/cm^2$) sold under the designation of Type R-52G from Ultra Violet Inc., U.S.A. may be conveniently used as the ultraviolet source 20. Also, a mercury vapor lamp may be effectively used as the ultraviolet source 20 because it significantly emits ultraviolet rays. For example, a mercury vapor lamp (160WH) sold under the designation of BHRF from Iwasaki Electrics Co., Ltd., Tokyo, Japan may be effectively used for this purpose. From the viewpoint of a cost, such a mercury vapor lamp is preferably used.

The photo or ultraviolet degradation is carried out at a temperature sufficient to cause the binder forming polymer to be subject to photo degradation by ultraviolet rays. For example, under an atmospheric pressure, it is preferably practiced at a temperature between 150° C. and 300° C. in view of the economical efficiency of the present invention, the photo or ultraviolet degradation properties of the polymer, the practicability of the present invention and the like. This permits not only the velocity of the photo degradation to be significantly increased but the binder removal to be substantially easily practiced. Also, this permits the economical efficiency of the present invention to be positively ensured. Further, the above-described temperature range between 150° C. and 300° C. further enhances the fluidizing or liquefaction of the polymer, to thereby substantially promote the photo degradation of the polymer by ultraviolet rays. Moreover, this exhibits another advantage of substantially preventing most of powder materials used for the green body from being oxidized. When the green body is made of a powder material which is readily oxidized or apt to be oxidized at a temperature within the above-described range, the photo degradation of the binder may be carried out by rendering the atmosphere of the chamber 14 non-oxidizing using, for example, nitrogen or the like. The green body 10 may be heated by means of a heater 22.

Figure 2:
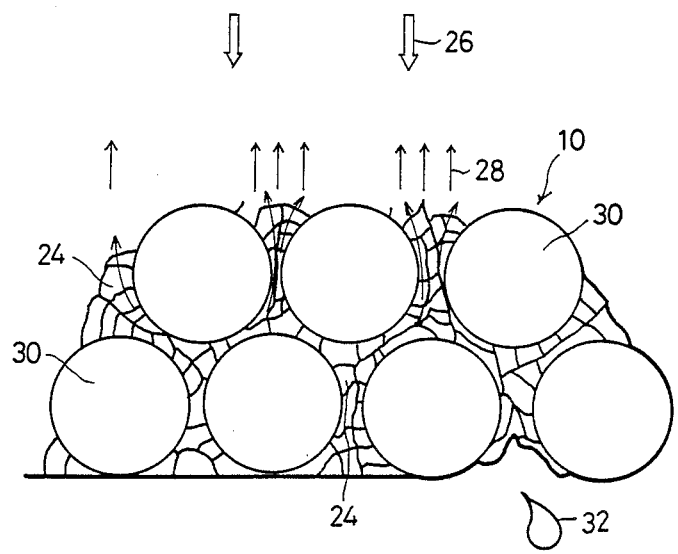
FIG. 2 is a fragmentary sectional view of a green body showing the removal of a binder from the green body.

In the binder removal of the present invention by photo or ultraviolet degradation, as shown in FIG. 2, the heating of the green body 10 causes a binder or polymer 24 on and near the surface of the green body 10 to be liquefied and then subject to photo or ultraviolet degradation by ultraviolet rays irradiated to the green body 10 as indicated at arrows 26 in FIG. 2. This results in the polymer 24 being vaporized as indicated at arrows 28. During this process, a binder or polymer 24 at the interior of the green body 10 is fluidized or liquefied and moved to the surface of the green body 10 through gaps between powders 30 of the green body 10 due to a capillary action. Then, it is subject to photo degradation to lead to the vaporization, so that the binder removal may be promoted. Also, the binder fluidized by heating is decreased in degree of polymerization to form liquid 32 which exhibits a substantially reduced viscosity at a low temperature as well as a high temperature, so that the liquid 32 may flow down onto the support 12, resulting in the binder removal being further promoted. Thus, the support 12 is preferably made of a material which is capable of absorbing the binder.

In FIG. 1, reference numerals 34, 36, 38 and 40 designate a heat insulating material, a lagging material, a ceramic wool and a glass plate, respectively, which are arranged so as to form the insulating means briefly described, to thereby keep the chamber 14 of the oven unit 16 thermally insulated from the exterior of the oven unit 16. The glass plate 40 may be made of a quartz or silica glass material so that ultraviolet rays readily penetrate through the glass plate 40. For this purpose, a transparent silica glass plate (2 mm in thickness) sold under the designation of T1030 from Toshiba Ceramics Co., Ltd., Tokyo, Japan and a heat-resistant glass plate (2 mm in thickness) sold under the designation of IWAKI 7740 from Iwaki Glass Co., Ltd., Tokyo, Japan may be conveniently used because they permit ultraviolet rays of a short wavelength to readily penetrate therethrough.

As described above, in the present invention, the binder mainly consists of a polymer material of ultraviolet degradation properties, so that the irradiation of ultraviolet rays to the green body may cause the binder or polymer to be subject to photo or ultraviolet degradation. This leads to, for example, the vaporization and volatilization of the binder, resulting in the removal of the binder from the green body being effectively carried out.

As can be seen from the foregoing, in the present invention, the binder mainly consisting of an ultraviolet degradation type polymer material is used for forming the green body of a powder material by molding and ultraviolet rays are irradiated to the green body to carry out the photo degradation of the binder, to thereby remove the binder from the shaped article or green body. Accordingly, the present invention permits the binder removal to be carried out at a substantially reduced temperature and for a significantly decreased period of time as compared with the prior art without adversely affecting a final shaped product.

The invention will be understood more readily with reference to the following examples; however, these examples are intended to illustrate the invention and are not be construed to limit the scope of the invention.

EXAMPLE 1

In this example, a polymer material of ultraviolet degradation properties was used as a binder for forming a shaped article or green body and the removal of the binder was carried out by photo degradation.

For this purpose, polymethacrylate polymer and poly-α-methylstyrene polymer which have satisfactory compatibility with paraffin wax each were used as the ultraviolet degradation type polymer in the present invention. As polymethacrylate were used those sold under the designation of BR 115 (about 55,000 in molecular weight) and BR 116 (about 45,000 in molecular weight) from Mitsubishi Rayon Company Limited, Japan. Also, as poly-α-methylstyrene was used that sold under the designation of AMOCO 240 (about 790 in molecular weight) from Amoco Chemical Corporation, U.S.A. The polymers and a mixture thereof each were fully mixed at a temperature of 150° C. with a paraffin wax material which has been conventionally incorporated in a binder for a green body, resulting in preparing a binder.

The so-prepared binder was kneaded with a metal powder of SUS 304 stainless steel having an average particle size of 10 microns to form a pellet.

For comparison, a comparison binder was prepared in substantially the same manner using a cross linking type polymer material which does not or is hard to cause photo degradation. As the polymer for this purpose were used polyethylene sold under the designation of MS330 from Mitsubishi Petrochemical Company Limited, Japan and polypropylene sold under the designation of MA2A from Mitsubishi Petrochemical Company Limited.

In each of the binders prepared as described above, paraffin wax was incorporated in an amount of 40 to 60 wt% in order to permit the pellet to exhibit sufficient flowability or fluidity during the injection molding operation.

The so-obtained binders each had such a composition as shown in Table 2.

TABLE 2

| Specimen No. | Composition of Binder (wt %) | | | | Amount of Binder to Metal Powder (Parts by Weight) | Metal Powder (Parts by Weight) SUS 34 |
|---|---|---|---|---|---|---|
| | BR 115 | BR 116 | AMOCO 240 | Paraffin Wax | | |
| 1 | 50 | — | — | 50 | 10.5 | 100 |
| 2 | — | 50 | — | 50 | 11.0 | 100 |
| 3 | — | — | 50 | 50 | 8.7 | 100 |
| 4 | — | 50 | 10 | 40 | 12.5 | 100 |
| 5 | — | 30 | 20 | 50 | 10.9 | 100 |
| 6 | Polyethylene (MS30) 60 | | | 40 | 11.87 | 100 |
| 7 | Polypropylene (MA2A) 50 | | | 50 | 12.36 | 100 |

Specimens Nos. 1 to 5 each are the binder for the present invention.
Specimens Nos. 5 and 6 each are the comparison binder.

The binders each were added to 5 kg of a metal powder material in different amounts as shown in Table 2, resulting a mixture, which was then kneaded in a vacuum kneader at a temperature of about 150° C. for one hour to form a homogeneous slurry. The kneader used was manufactured by Daruton Co., Ltd., Japan and had a volume of 5l. Thereafter, the so-formed slurry was cooled, pulverized and then formed into a pellet.

Then, the pellet was subject to injection molding to form a plate-like green body having dimensions of 20 mm in length, 20 mm in width and 3 mm in thickness, which was used as a specimen for the binder removal. The injection molding was carried out at a molding temperature within the range of from 130° C. to 160° C. under a molding pressure within the range of from 600 kg/cm$^2$ to 800 kg/cm$^2$. The molding temperature and pressure were set within the above-described ranges in view of the viscosity of the binder, its flowability, its melting point and the like.

Then, the removal of the binder from the green body was carried out using a photo degradation oven unit constructed as shown in FIG. 1. The binder removal was practiced by irradiating the green body with ultraviolet rays while keeping the green body at a temperature within the range of from 200° C. to 250° C. for 2 to 10 hours. As an ultraviolet source was used each of the above-described commercially available high-intensity short-wavelength ultraviolet lamp and mercury vapor lamp. The intensity of irradiation of ultraviolet rays was measured by means of an ultraviolet intensity measuring device of the analog type sold under the designation of J-225 from Ultra Violet Inc., U.S.A. Also, a heat-resistant glass plate of 3 mm in thickness sold under the designation of IWAKI 7740 from Iwaki Glass Co., Ltd., Japan was used as the glass plate 14 shown in FIG. 1.

For comparison, only a heating treatment was practiced on each of specimens of the binder for the present invention and the comparison binder without any irradiation of ultraviolet rays thereto.

The heating took place at a rate of temperature rise of 32° C./hr in order to prevent the generation of any void and crack. After the binder removal, the green body was cooled to measure the ratio of removal of the binder from the green body. The results were as shown in Table 3.

TABLE 3

| Speci-men No. | Ratio of Removal of Binder (%) | | |
|---|---|---|---|
| | No Irradiation | Irradiation from Mercury Vapor Lamp[*1] | Irradiation from Ultra-Violet Lamp[*2] |
| 1 | 54.0 | 81.9 | 79.8 |
| 2 | 53.6 | 86.4 | 84.3 |
| 3 | 55.4 | 78.0 | 75.6 |
| 4 | 55.4 | 84.0 | 83.1 |
| 5 | 60.3 | 84.7 | 81.5 |
| 6 | 19.7 | 21.7 | 21.8 |
| 7 | 40.9 | 41.7 | 44.8 |

[*1]Intensity of Irradiation: 500 μW/cm²
[*2]Intensity of Irradiation: 350 μW/cm²

The ratio of removal of the binder from the green body was calculated according to the following equation:

$$\frac{(A-B)/A}{C} \times 100$$

wherein A indicates the weight of the green body the binder removal, B indicates the weight of the green body after the binder removal, and C indicates the weight of the binder used.

Table 3 indicates that the binder removal method of the present invention accomplishes the removal of the binder from the green body in a substantially reduced period of time. Also, it is noted from Table 3 that a commercially readily available mercury vapor lamp as well as an expensive ultraviolet lamp can be effectively used as an ultraviolet source.

In Table 3, the irradiation of ultraviolet rays by the ultraviolet lamp causes the ratio of removal of the binder to be decreased as compared with that by the mercury vapor lamp. This is due to a difference in intensity of ultraviolet rays irradiated to the green body between both lamps. This was revealed from the fact that the setting of of operative conditions of both lamps for permitting substantially the same amount of ultraviolet rays to be radiated therefrom caused the ratios of removal of the binder by both lamps to be substantially equal to each other.

Further, the ratio of removal of the binder was measured for each of the specimens prepared as described above while varying the heating temperature, wherein the above-described mercury vapor lamp was used. The intensity of irradiation of ultraviolet rays by the mercury vapor lamp was set to be 500 μW/cm² and 2500 μW/cm². The results were as indicated in Table 4.

As will be noted from Table 4, the binder removal process of the present invention permits the binder to be removed from the green body at a substantially reduced temperature and in a significantly decreased period of time as compared with the prior art.

Also, the measurement for the ratio of removal of the binder was carried out while varying the treatment time, wherein the above-described mercury vapor lamp was used. The intensity of irradiation of ultraviolet rays by the mercury vapor lamp was set to be 500 μW/cm². The results were as indicated in Table 5.

TABLE 5

| Specimen No. | Effect of Heating Time on Binder Removal | | |
|---|---|---|---|
| | Ratio of Removal of Binder (%) | | |
| | 2 Hours | 5 Hours | 10 Hours |
| 1 | 75.6 | 81.3 | 85.4 |
| 2 | 78.6 | 86.3 | 91.6 |
| 3 | 72.9 | 75.8 | 80.3 |
| 4 | 79.4 | 84.9 | 88.5 |
| 5 | 74.2 | 84.7 | 85.8 |
| 6 | 21.0 | 24.5 | 27.8 |
| 7 | 39.6 | 41.7 | 44.7 |

As will be apparent from Table 5, the binder removal method of the present invention permits the binder removal to be carried out in a substantially reduced period of time as compared with the prior art.

EXAMPLE 2

This example took place in order to study the effect of the binder removal method of the present invention on a final shaped product.

First, specimens of the binder for the present invention each having a composition shown in Table 6 (Specimens Nos. 11 to 21) were prepared according to the procedures described in Example 1. Then, each of the binders was added to a powder material for a shaped article in an amount shown in Table 7 to obtain a mixture, which is then kneaded at a temperature of 150° C. for about 1 to 1.5 hours in a vacuum kneader to prepare a homogeneous slurry. The so-prepared slurry was then cooled. Thereafter, the slurry was pulverized to particles having an average particle diameter of about 4 mm and then formed into a pellet.

Each of the so-formed pellets was subject to injection molding under conditions shown in Table 8 to form a shaped article of a bowl-like shape or a green body having a maximum diameter of 65 mm and a maximum thickness of 7 mm. Then, the green body was placed in

TABLE 4

| Specimen No. | Intensity of U.V. Rays (μW/cm²) | Effect of Temperature on Binder Removal | | | | | | |
|---|---|---|---|---|---|---|---|---|
| | | Ratio of Removal of Binder (%) | | | | | | |
| | | Heating Temperature | | | | | | |
| | | 150° C. | 200° C. | 250° C. | 300° C. | 350° C. | 400° C. | 550° C. |
| 1 | 500 | 50.1 | 72.3 | 75.6 | 84.4 | 93.5 | 100 | 100 |
| | 2500 | 81.0 | 89.2 | 100 | 100 | | | |
| 2 | 500 | 50.4 | 75.3 | 78.6 | 82.6 | 100 | 100 | 100 |
| | 2500 | 79.2 | 81.6 | 100 | 100 | | | |
| 3 | 500 | 45.3 | 59.0 | 64.9 | 89.4 | 98.4 | 100 | 100 |
| | 2500 | 64.8 | 79.4 | 100 | 100 | | | |
| 4 | 500 | 52.7 | 78.2 | 79.4 | 94.0 | 100 | 100 | 100 |
| | 2500 | 83.7 | 97.3 | 100 | 100 | | | |
| 5 | 500 | 53.8 | 70.2 | 74.2 | 86.0 | 100 | 100 | 100 |
| | 2500 | 82.4 | 95.4 | 100 | 100 | | | |
| 6 | 500 | 5.2 | 18.3 | 21.0 | 24.3 | 27.4 | 38.6 | 100 |
| | 2500 | 17.1 | 19.4 | 21.4 | 24.6 | | | |
| 7 | 500 | 18.8 | 29.5 | 39.6 | 42.8 | 44.1 | 100 | 100 |
| | 2500 | 26.6 | 30.8 | 43.8 | 44.9 | | | | a photo gradation oven unit constructed as shown in FIG. 1 and was subject to a binder removal treatment under conditions shown in Table 8. Subsequently, the green body was subject to a sintering treatment to obtain a final shaped product. The so-obtained final products each were completely free of any deformation, distortion and damage such as cracks.

TABLE 6

| Specimen No. | Composition of Binder (wt %) | | | |
|---|---|---|---|---|
| | BR 116 | BR 115 | AMOCO 240 | Paraffin Wax |
| 11 | 50 | — | — | 50 |
| 12 | 50 | — | — | 50 |
| 13 | — | 50 | — | 50 |
| 14 | — | 50 | — | 50 |
| 15 | 50 | — | 10 | 40 |
| 16 | 50 | — | 10 | 40 |
| 17 | 50 | — | 10 | 40 |
| 18 | 50 | — | 10 | 40 |
| 19 | 30 | — | 20 | 50 |
| 20 | 30 | — | 20 | 50 |
| 21 | 30 | — | 20 | 50 |

TABLE 7

| Specimen No. | Powder Material for Green Body | | Binder | | Vacuum Kneading Time (hr) |
|---|---|---|---|---|---|
| | Form | Material | Average Particle Size (μm) | Amount of Addition (wt %) | |
| 11 | Metal Powder | SUS316L | 9.9 | 11.0 | 1.0 |
| 12 | Metal Powder | SUS304L | 8.7 | 10.0 | 1.0 |
| 13 | Metal Powder | SUS410L | 10.1 | 10.0 | 1.0 |
| 14 | Metal Powder | AISI440C | 16.0 | 12.0 | 1.0 |
| 15 | Metal Powder | Fe-6% Si | 10.5 | 14.0 | 1.0 |
| 16 | Metal Powder | Fe-6% Si + Carbonyl Fe (50%) (50%) | 9.5 | 12.0 | 1.0 |
| 17 | Metal Powder | SUS410L + Carbon Powder (99.7%) (0.3%) | 10.0 | 10.0 | 1.0 |
| 18 | Metal Powder | Carbonyl Fe + Carbonyl Ni (98%) (2%) | 7.5 | 10.0 | 1.0 |
| 19 | Ceramic Powder | Alumina | 0.5 | 20.0 | 1.5 |
| 20 | Ceramic Powder | Stabilized Zirconia | 0.3 | 25.0 | 1.5 |
| 21 | Ceramic Powder | Silica | 6.0 | 20.0 | 1.0 |

TABLE 8

| Specimen No. | Conditions for Injection Molding | | Conditions for Binder Removal | | | | | Conditions for Sintering | | | Sintering Density (g/cm³) |
|---|---|---|---|---|---|---|---|---|---|---|---|
| | Molding Pressure (kg/cm²) | Molding Temp. (°C.) | Intensity of U.V. Rays (μW/cm²) | Rate of Temp. (°C./hr) | Heating Temp. Rise (°C.) | Holding Time (hr) | Atmosphere | Sintering Temp. (°C.) | Time (hr) | Atmosphere | |
| 11 | 1080 | 130 | 500 | 32 | 250 | 5 | Air | 1250 | 1 | Vacuum | 89 |
| 12 | 1080 | 130 | 500 | 32 | 250 | 5 | Air | 1250 | 1 | Vacuum | 90 |
| 13 | 1080 | 140 | 500 | 32 | 250 | 5 | Air | 1250 | 1 | Vacuum | 90 |
| 14 | 1080 | 140 | 500 | 32 | 250 | 5 | Air | 1250 | 1 | Vacuum | 90 |
| 15 | 1080 | 140 | 500 | 32 | 250 | 5 | Air | 1180 | 0.5 | Vacuum | 97 |
| 16 | 1080 | 130 | 500 | 32 | 250 | 5 | Air | 1200 | 0.5 | Vacuum | 96 |
| 17 | 1080 | 140 | 500 | 32 | 250 | 5 | Air | 1250 | 1 | Vacuum | 92 |
| 18 | 1080 | 130 | 500 | 32 | 250 | 5 | Air | 1250 | 1 | Vacuum | 93 |
| 19 | 1530 | 150 | 500 | 5 | 300 | 5 | Air | 1600 | 1 | Vacuum | 99.7 |
| 20 | 1530 | 150 | 500 | 5 | 300 | 5 | Air | 1500 | 1 | Vacuum | 99.7 |
| 21 | 1530 | 150 | 500 | 8 | 300 | 5 | Air | 1300 | 1 | Vacuum | 80 |

While the present invention has been described with a certain degree of particularity with reference to the embodiment and examples, obvious modifications and variations are possible in the light of the above teachings. It is therefore to be understood that within the scope of the appended claims, the invention may be practiced otherwise than as specifically described.

What is claimed is:

1. A method for removing a binder from a green body, said binder mainly consisting of a polymer material of ultraviolet degradation properties, comprising the step of:

irradiating said green body with ultraviolet rays at a temperature sufficient to cause said polymer material to carry out photo degradation by ultraviolet rays, resulting in said binder being removed from said green body.

2. A method as defined in claim 1, wherein said polymer material has a main chain containing a tertiary carbon atom.

3. A method as defined in claim 2, wherein said main chain of said polymer material has a carbon atom to which groups selected from the group consisting of an alkyl group, a phenyl group, a carbonyl group and a group having a $\pi$ electron or a non-covalent electron pair are bonded.

4. A method as defined in claim 3, wherein said polymer material has a molecular weight of about 200,000 or less.

5. A method as defined in claim 1, wherein the irradiation of ultraviolet rays to said green body is carried out while heating said green body.

6. A method as defined in claim 5, wherein the heating of said green body is carried out at a temperature of about 300° C. or less.

7. A method as defined in claim 5, wherein the heating of said green body is carried out at a temperature within the range of from 150° C. to 300° C. under an atmospheric pressure.

8. A method as defined in claim 1, wherein the irradiation of ultraviolet rays to said green body is carried out using a mercury vapor lamp.

9. A method as defined in claim 1, wherein said polymer is selected from the group consisting of polyisobutylene, polymethacrylic acid, polymethacrylate, polymethacrylamide, poly-α-methylstyrene and mixtures thereof.

10. A method for removing a binder from a green body, said binder mainly consisting of a polymer material of ultraviolet degradation properties, comprising the step of:

irradiating said green body with ultraviolet rays at a temperature of 300° C. or less to carry out the photo degradation of said polymer material by ultraviolet rays, resulting in said binder being removed from said green body.

11. A method for removing a binder from a green body, said binder mainly consisting of a polymer material of ultraviolet degradation properties, comprising the step of:

irradiating said green body with ultraviolet rays at a temperature within the range of from 150° C. to 300° C. under an atmospheric pressure to carry out the photo degradation of said polymer material by ultraviolet rays, resulting in said binder being removed from said green body.

* * * * *